United States Patent
Chen

(10) Patent No.: US 8,855,080 B2
(45) Date of Patent: Oct. 7, 2014

(54) METHOD, DEVICE, AND DATA FRAME FOR SPECTRUM SENSING

(71) Applicant: Huawei Technologies Co., Ltd., Shenzhen (CN)

(72) Inventor: Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/283,397

(22) Filed: May 21, 2014

(65) Prior Publication Data

US 2014/0254415 A1 Sep. 11, 2014

Related U.S. Application Data

(63) Continuation of application No. PCT/CN2012/084926, filed on Nov. 21, 2012.

(30) Foreign Application Priority Data

Nov. 21, 2011 (CN) .......................... 2011 1 0370961

(51) Int. Cl.
*H04W 4/00* (2009.01)
*H04W 16/14* (2009.01)
*H04L 1/00* (2006.01)

(52) U.S. Cl.
CPC ................................... *H04W 16/14* (2013.01)
USPC .......................................... 370/329; 370/252

(58) Field of Classification Search
CPC combination set(s) only.
See application file for complete search history.

(56) References Cited

U.S. PATENT DOCUMENTS

2008/0225789 A1* 9/2008 Kim et al. ...................... 370/329
2011/0002405 A1 1/2011 Raveendran (Continued)

FOREIGN PATENT DOCUMENTS

CN 101026446 A 8/2007
CN 101895895 A 11/2010

(Continued)

OTHER PUBLICATIONS

"Reconfigurable Radio Systems (RRS); Feasibility Study on Radio Frequency (RF) Performances for Cognitive Radio Systems Operating in UHF TV Band White Spaces," Draft ETSI TR 103 067, V0.07, Technical Report, 2011, 62 pages.

(Continued)

*Primary Examiner* — Clemence Han
(74) *Attorney, Agent, or Firm* — Conley Rose, P.C.; Grant Rodolph

(57) ABSTRACT

A method, device, and data frame for spectrum sensing. The method for spectrum sensing includes: determining configuration information of a spectrum sensing guard interval in a guard period (GP) used to prevent interference; setting a quiet period in the guard period according to the configuration information of the spectrum sensing guard interval; and performing the spectrum sensing in the quiet period. In the present invention, effectively avoiding the interference caused by the signal transmission to the spectrum sensing, and the spectrum sensing is performed in the condition that the signal transmission is not affected.

20 Claims, 3 Drawing Sheets

(56) References Cited

U.S. PATENT DOCUMENTS

| | | | | |
|---|---|---|---|---|
| 2011/0128895 | A1* | 6/2011 | Sadek et al. | 370/280 |
| 2012/0039284 | A1* | 2/2012 | Barbieri et al. | 370/329 |
| 2012/0069886 | A1* | 3/2012 | Muraoka | 375/224 |
| 2012/0113918 | A1* | 5/2012 | Freda et al. | 370/329 |
| 2012/0294163 | A1* | 11/2012 | Turtinen et al. | 370/252 |
| 2012/0320741 | A1* | 12/2012 | Freda et al. | 370/229 |
| 2013/0064197 | A1* | 3/2013 | Novak et al. | 370/329 |
| 2013/0223398 | A1* | 8/2013 | Li et al. | 370/329 |
| 2014/0079016 | A1* | 3/2014 | Dai et al. | 370/330 |
| 2014/0161002 | A1* | 6/2014 | Gauvreau et al. | 370/280 |

FOREIGN PATENT DOCUMENTS

| | | |
|---|---|---|
| CN | 101990231 A | 3/2011 |
| WO | 2010097722 A1 | 9/2010 |
| WO | 2011102651 A2 | 8/2011 |

OTHER PUBLICATIONS

"Part 22: Cognitive Wireless Ran Medium Access Control (MAC) and Physical Layer (PHY) Specifications: Policies and Procedures for Operation in the TV Bands," IEEE Standard for Information Technology, Telecommunications and Information Exchange between systems, Wireless Regional Area Networks (WRAN)—Specific Requirements, IEEE Computer Society, IEEE Std 802.22, Jul. 1, 2011, 672 pages.

Foreign Communication From A Counterpart Application, PCT Application No. PCT/CN2012/084926, English Translation of International Search Report dated Feb. 28, 2013, 2 pages.

Foreign Communication From A Counterpart Application, PCT Application No. PCT/CN2012/084926, English Translation of Written Opinion dated Feb. 28, 2013, 5 pages.

* cited by examiner

METHOD, DEVICE, AND DATA FRAME FOR SPECTRUM SENSING

CROSS-REFERENCE TO RELATED APPLICATIONS

This application is a continuation of International Application No. PCT/CN2012/084926, filed on Nov. 21, 2012, which claims priority to Chinese Patent Application No. 201110370961.8, filed on Nov. 21, 2011, both of which are hereby incorporated by reference in their entireties.

TECHNICAL FIELD

The present invention relates to radio communications technologies, and in particular, to a method, device, and data frame for spectrum sensing.

BACKGROUND

Cognitive radio (CR) is the most promising technology to address spectrum resource shortage at present. By using the cognitive radio technology, frequency bands may be dynamically accessed under the premise that a primary user (PU) is not interfered, so as to improve spectrum utilization rate. At present, the Federal Communications Commission in the United States has officially released regulations to allow devices to access the television white spectrum (TVWS or TV white spectrum) under the premise that no interference is caused. In addition, as specified in standards such as Institute of Electrical and Electronics Engineers (IEEE) 802.22 being formulated by the Institute of Electrical and Electronics Engineers, the TVWS serves as a target frequency band of spectrum sharing.

Spectrum sensing is one of the core technologies of the cognitive radio, and an objective thereof is to find an idle spectrum not in use by radio spectrum detection, so as to provide the spectrum to a CR system for using. The spectrum sensing has two categories, namely, in-band sensing and out-of-band sensing, where the in-band sensing refers to sensing for spectrum being used by the CR system, and aims to exit the spectrum when a primary user signal occurs; and the out-of-band sensing refers to sensing for spectrum not used by the CR system, and aims to find the idle spectrum not in use. In order to avoid that data transmission of the CR system causes interference to spectrum sensing, the in-band sensing needs to be performed in a quiet period (QP). In the quiet period, the CR system cannot perform data transmission, so as to avoid interference. Therefore, the design of the quiet period not only guarantees the spectrum sensing performance, but also needs to consider the influence on the CR system due to transmission interruption.

In the IEEE 802.22, in-band sensing is performed by setting a specific quiet period in a radio frame. The spectrum sensing is performed in two quiet periods of intraframe sensing and interframe sensing. The position and the length of the quiet period are controlled by a base station, and are sent to a terminal. In the quiet period, the base station and the terminal stops receiving and sending of all data, and performs spectrum sensing. However, in this quiet period setting solution, it is required to reserve time in a frame structure for the quiet period specifically. If the setting method of the quiet period is introduced to an existing system, for example, a time-division long-term evolution (TD-LTE) system, an existing protocol needs to be changed greatly, which results in significant increase of the system complexity.

SUMMARY

Embodiments of the present invention provide a method, device, and data frame for spectrum sensing, which are compatible with a protocol of an existing system without significantly increasing the system complexity.

According to an aspect of an embodiment of the present invention, a method for spectrum sensing is provided, where the method may include: determining configuration information of a spectrum sensing guard interval in a guard period (GP), where the spectrum sensing guard interval prevents interference caused by signal transmission to spectrum sensing, the configuration information indicates a position of the spectrum sensing guard interval in the guard period, and the guard period is a period of time in which signal sending is stopped to prevent signal interference; setting a quiet period in the guard period according to the configuration information of the spectrum sensing guard interval; and performing the spectrum sensing in the quiet period.

According to another aspect of an embodiment of the present invention, a device for spectrum sensing is provided, where the device may include: a determining unit configured to determine configuration information of a spectrum sensing guard interval in a guard period, where the spectrum sensing guard interval prevents interference caused by signal transmission to spectrum sensing, the configuration information indicates a position of the spectrum sensing guard interval in the guard period, and the guard period is a period of time in which signal sending is stopped to prevent signal interference; a setting unit configured to set a quiet period in the guard period according to the configuration information of the spectrum sensing guard interval; and a sensing unit configured to perform the spectrum sensing in the quiet period.

According to still another aspect of an embodiment of the present invention, a data frame for spectrum sensing is provided, where the data frame is recorded in a guard period in which signal sending is stopped to prevent signal interference, and the data frame includes: a spectrum sensing guard interval that prevents interference caused by signal transmission to spectrum sensing, where a position of the spectrum sensing guard interval in the guard period is indicated by configuration information of the spectrum sensing guard interval; and a quiet period, where the spectrum sensing is performed in the quiet period, and the quiet period is determined according to the configuration information of the spectrum sensing guard interval.

In the technical solutions according to the embodiments of the present invention, the guard period in a transmission frame is used again, and the quiet period is set in the guard period, thereby ensuring the compatibility with an existing protocol without significantly increasing the system complexity.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention.

The technical solutions of the embodiments of the present invention may be applicable to various communication systems, such as Global System for Mobile Communications (GSM), code division multiple access (CDMA) system, wideband CDMA (WCDMA), general packet radio service (GPRS), and TD-LTE.

A user equipment (UE) may also be referred to as a mobile terminal, a mobile user equipment, or the like, and may communicate with one or more core networks over a radio access network (RAN). The user equipment may be a mobile terminal, for example, a mobile telephone (or referred to as a "cellular phone") and a computer having a mobile terminal, for example, it may be a portable mobile device, a pocket mobile device, a handheld mobile device, a mobile device built in a computer, or a vehicle-mounted mobile device, which exchange language and/or data with the radio access network.

A base station may be a base transceiver station (BTS) in GSM or CDMA, and may also be a base station (NodeB) in WCDMA, and may still be an evolved base station (evolved NodeB, eNB, or e-NodeB) in LTE or LTE-Advanced, a home base station (HeNB or Home e-NodeB), and a relay node (RN) in the LTE-Advanced, which is not limited in the present invention.

For ease of description, a base station (eNB) and a user equipment (UE) are taken as examples for illustration.

The present invention is applicable to conditions that a guard period exists in signal transmission, or an interval in which signal transmission is stopped to prevent interference, for example, is applicable to a wireless regional area network (WRAN) system adopting time division duplex, and a broadcast system adopting a time division multiplexing technology. The technical solution of the embodiments of the present invention mainly lies in that a guard period used to prevent interference and existing in signal transmission, or an idle interval is used again, a spectrum sensing guard interval used to avoid signal transmission interference is set in the guard period, and a quiet period in which signal transmission is prohibited for spectrum sensing is set in the guard period. By setting the quiet period in the guard period, the compatibility with an existing protocol is ensured while the system complexity is not significantly increased. By setting the spectrum sensing guard interval in the guard period, interference caused by the signal transmission to the spectrum sensing is effectively avoided, and the spectrum sensing is performed in the condition that the signal transmission is not affected.

Figure 1:
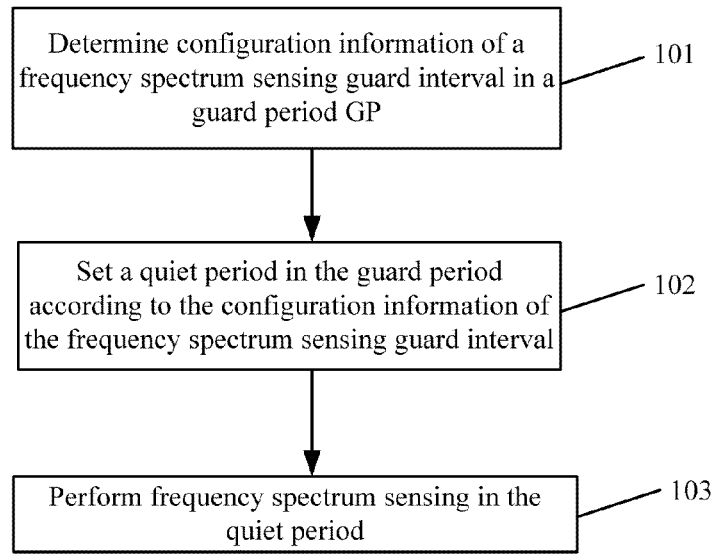
FIG. 1 shows a method for spectrum sensing according to an embodiment of the present invention.

FIG. 1 shows a method 100 for spectrum sensing according to an embodiment of the present invention. The method may be applied to the communication system, and a base station may implement the method. As shown in FIG. 1, the method includes the following steps:

101: Determine configuration information of a spectrum sensing guard interval in a guard period, where the spectrum sensing guard interval prevents interference caused by signal transmission to spectrum sensing, the configuration information indicates a position of the spectrum sensing guard interval in the guard period, and the guard period is a period of time in which signal sending is stopped to prevent signal interference. Optionally, as an embodiment, the spectrum sensing guard interval may include at least one of a front guard interval at a front end of the guard period and a back guard interval at a back end of the guard period.

102: Set a quiet period in the guard period according to the configuration information of the spectrum sensing guard interval.

103: Perform the spectrum sensing in the quiet period.

A time division duplex communication system adopting a TD-LTE technology is taken as an example to illustrate the method 100 for spectrum sensing according to the embodiment of the present invention in the following, but the present invention is not limited thereto.

In the time division duplex communication system adopting the TD-LTE technology, because the same spectrum is shared by uplink signal transmission and downlink signal transmission, and in order to meet communication needs of them, switching between the uplink signal transmission and the downlink signal transmission is generally required. When a downlink subframe needs to be switched into an uplink subframe, and in order to prevent interference between uplink and downlink, a special subframe is inserted into the downlink subframe and the uplink subframe.

Figure 2A:
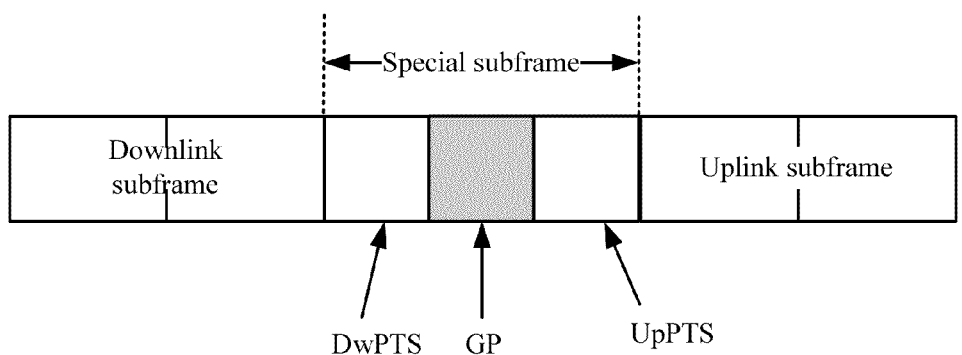
FIG. 2A shows a special subframe in a TD-LTE system in the prior art.

FIG. 2A shows a special subframe in a TD-LTE system in the prior art. As shown in FIG. 2A, the special subframe is inserted between a downlink subframe and an uplink subframe, where the special subframe is formed by three parts, namely, a downlink pilot time slot (DwPTS), a GP, and an uplink pilot time slot (UpPTS). In the guard period GP, an evolved base station (evolved Node B or eNB) stops signal sending and receiving. Specifically, after signal transfer from the eNB to a UE is performed in the downlink subframe, the DwPTS, the GP, UpPTS in the special subframe are started in sequence, and after transmission in the UpPTS is completed, uplink subframe transferring from the UE to the eNB is started.

Figure 2B:
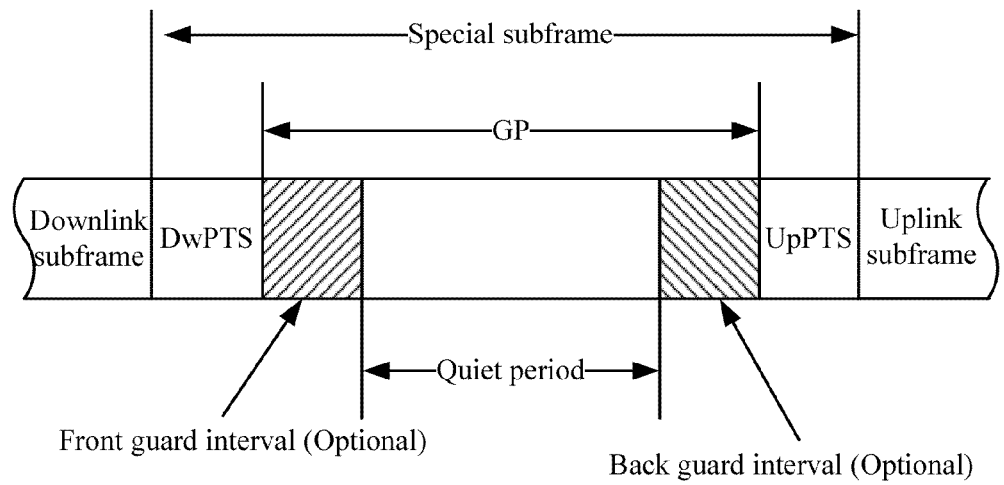
FIG. 2B shows a frame structure about setting a quiet period in a guard period according to an embodiment of the present invention.

FIG. 2B shows a frame structure about setting a quiet period in a guard period in the special subframe according to an embodiment of the present invention. The difference between the frame structure shown in FIG. 2B according to embodiment of the present invention and the frame structure shown in FIG. 2A lies in the guard period, and other parts are the same as those shown in FIG. 2A. Therefore, the guard period in the frame structure is described with an emphasis in the embodiment of the present invention. The guard period of the frame structure shown in FIG. 2B includes: a spectrum sensing guard interval that prevents interference caused by signal transmission to spectrum sensing; a quiet period, used for spectrum sensing, where the quiet period is set according to the configuration information of the spectrum sensing guard interval. The spectrum sensing guard interval includes a front guard interval at a front end of the guard period or a back guard interval at a back end of the guard period, and may also include one of the front guard interval at the front end of the guard period and the back guard interval at the back end of the guard period. The front guard interval is optional, and the back guard interval is also optional, as long as at least one of the two exists.

In the method 100 for spectrum sensing according to the embodiment of the present invention, determining the configuration information of the spectrum sensing guard interval in the guard period (step 101) is determining the configuration information of the front guard interval or the back guard interval in the guard period, or the configuration information of the front guard interval and the back guard interval.

The determining manner of the configuration information of the front guard interval and the determining manner of the configuration information of the back guard interval are described in detail with reference to FIG. 3 and FIG. 4.

Figure 3:
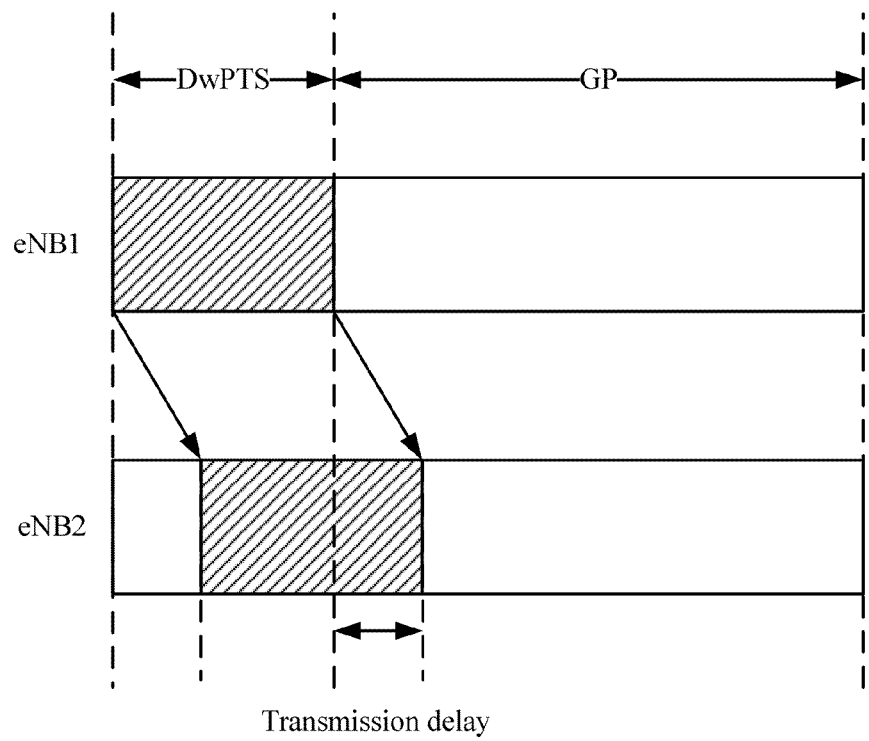
FIG. 3 shows interference between neighboring base stations that is located in a guard period and caused by transmission delay according to an embodiment of the present invention.

FIG. 3 shows interference between neighboring base stations that is located in a GP and caused by transmission delay according to an embodiment of the present invention. As shown in FIG. 3, eNB 1 and eNB 2 are neighboring intra-frequency base stations, and a certain distance exists between their geographical positions. When switching from a downlink subframe to an uplink subframe is performed, eNB 1 and eNB 2 stop downlink signal transmission simultaneously and enter the GP. However, signal transmission needs certain time, that is, transmission delay exists in the signal transmission, and therefore, in a period of time after eNB 2 enters the GP, and a downlink signal of eNB 1 also reaches eNB 2. And vice versa. If spectrum sensing is performed in the transmission delay of the GP, spectrum sensing performance may be affected. Therefore, to prevent interference to the spectrum sensing, the spectrum sensing needs to be performed after all signals that may cause interference pass through. This period of time used to avoid interference of a neighboring eNB is the front guard interval of the embodiment of the present invention.

In FIG. 3 and as a typical example, a start time of the front guard interval is the same as a start time of the GP, but the embodiment of the present invention is not limited thereto. Persons skilled in the art may enable the start time of the front guard interval to be later than the start time of the GP for a period of time according to practical requirement. In the condition that the start time of the front guard interval is the same as the start time of the GP, the configuration information of the front guard interval is the length of the front guard interval. The length $T_{GI1}$ of the front guard interval may be determined according to the following formula:

$$T_{GI1} \geq d/c \qquad \text{Formula 1,}$$

where d is a distance between a base station (for example, eNB 2) performing the spectrum sensing and a farthest base station (for example, eNB 1) causing interference to the spectrum sensing of the base station, and c is a transmission speed of about $3\times10^8$ m/s of an electromagnetic wave.

It should be noted that, as an example, when there is no base station causing interference to the spectrum sensing of the base station, or the interference caused by other base stations is negligible, the spectrum sensing guard interval in the guard period may not include the front guard interval, but only include the back guard interval.

Figure 4:
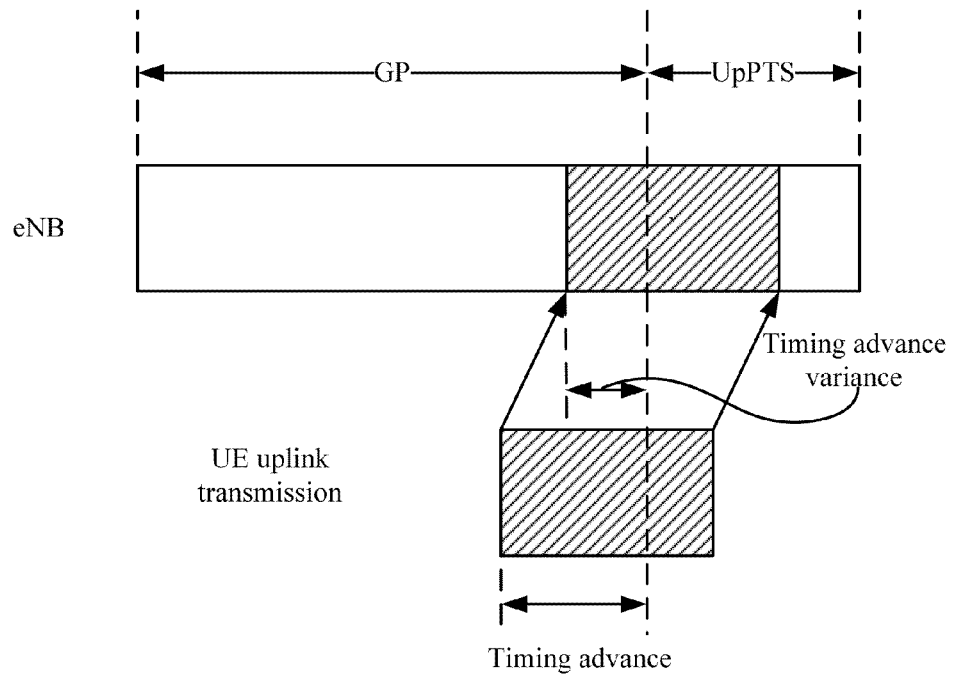
FIG. 4 shows interference of uplink transmission that is caused by a variance of an uplink timing advance according to an embodiment of the present invention.

FIG. 4 shows interference of uplink transmission that is caused by a variance of an uplink timing advance according to an embodiment of the present invention. After the GP, an eNB starts uplink signal receiving. Because a certain distance exists between the locations of the user equipment and the eNB, a signal of the UE takes a certain time to reach the eNB. Therefore, to enable the eNB to receive an uplink signal more effectively, the UE needs to send the uplink signal earlier than a receive window of the eNB for a period of time, and this period of time is referred to as timing advance (TA). In an ideal condition, uplink signals of all the UEs reach the eNB at the receive window of the eNB simultaneously. However, in an actual network, timing advance may have a certain variance, so that data of the UE reaches earlier or later than the receive window of the eNB. As shown in FIG. 4, if the data of the UE reaches earlier than the receive window of the eNB, its signal falls within the GP, and if spectrum sensing is performed then, sensing performance will be affected. Therefore, a guard interval needs to be added before the uplink subframe, so as to avoid interference of the uplink signal to the spectrum sensing, and ensure normal transmission of the uplink signal at the same time, where this period of time is the back guard interval.

In FIG. 4 and as a typical example, an end time of the back guard interval is the same as an end time of the GP, but the embodiment of the present invention is not limited thereto. The end time of the back guard interval can be earlier than the end time of the GP for a period of time according to practical requirement. In the condition that the end time of the back guard interval is the same as the end time of the GP, the configuration information of the back guard interval is the length of the back guard interval. The length $T_{GI2}$ of the back guard interval may be determined according to the following formula:

$$T_{GI2} \geq \text{MAX(Variance)} \qquad \text{Formula 2,}$$

where MAX(Variance) is the maximum value of the variance of the uplink timing advance.

It should be noted that, the back guard interval is optional. For example, an error of the TA is controlled, or the influence of an error of the TA is considered in an UpPTS after the guard period in the special subframe, so that the interference of the uplink signal in the guard period is reduced as much as possible, or even avoided. That is to say, the maximum value of the variance MAX (Variance) of the timing advance of the uplink signal is set in the uplink time slot after the guard period, or when the interference of the uplink signal is very small and may be neglected, the spectrum sensing guard interval of the guard period may not include the back guard interval, but only include the front guard interval.

At the same time, for the guard period used in a unidirectional transmission broadcast system, the back guard interval may also be not in existence, so that the configuration information of the quiet period is determined according to the configuration information of the front guard interval.

In addition, the spectrum sensing guard interval of the guard period may include the front guard interval and the back guard interval.

Therefore, the configuration information 101 of the spectrum sensing guard interval in the GP is determined according to the embodiment of the present invention, and the start time of the front guard interval may be set as the start time of the guard period or later than the start time of the guard period for a period of time according to requirements, and the length of the front guard interval is determined according to formula 1, so that the configuration information including the start time and the length of the front guard interval is determined. The end time of the back guard interval may be set as the end time of the guard period or earlier than the end time of the guard period for a period of time according to requirements, and the length of the back guard interval is determined according to formula 2, so as to determine the configuration information including the end time and the length of the back guard interval.

After the front guard interval and the back guard interval are determined, a quiet period is set according to at least one of the configuration information of the front guard interval and the configuration information of the back guard interval, so that the spectrum sensing is performed in the quiet period (step 102). Specifically, when the front guard interval exists and the back guard interval does not exist, the quiet period is set according to the configuration information of the front guard interval; when the back guard interval exists and the front guard interval does not exist, the quiet period is set according to the configuration information of the back guard interval; and when the front guard interval and the back guard interval both exist, the quiet period is set according to the configuration information of the front guard interval and the configuration information of the back guard interval.

Referring to FIG. 2B, the quiet period according to embodiment of the present invention is located between the front guard interval and the back guard interval, and occupies a period of time in the guard period except the front guard interval and the back guard interval. But the embodiment of the present invention is not limited thereto, a certain time difference may exist between the quiet period and the front guard interval according to actual requirement and a certain time difference may also exist between the quiet period and the back guard interval. The configuration information of the quiet period typically includes the start time and the length, and usually is determined according to the front guard interval and the configuration information of the back guard interval. However, the embodiment of the present invention is not limited thereto, and the configuration information thereof may be the end time and the length, or the start time and the end time, as long as the position thereof in the guard period is determined.

As a simple example of setting the configuration information of the quiet period, in the condition that the guard period only has the front guard interval but no back guard interval, if the end time of the quiet period is the same as the end time of the guard period, the configuration information of the quiet period may only include the length. Similarly, when the back guard interval exists and the front guard interval does not exist, if the start time of the quiet period is the same as the start time of the guard period, the configuration information of the quiet period may only include the length. If the front guard interval and the back guard interval both exist, the start time and the length of the quiet period may be determined according to the end time of the front guard interval and the start time of the back guard interval. After reading the embodiment of the present invention, persons skilled in the art may select the set configuration information of the quiet period, as long as the position and the length of the quiet period in the guard period are determined.

After the quiet period is set, the spectrum sensing is performed in the quiet period (step 103).

The method for spectrum sensing may be executed by the base station. Further, as another embodiment, the user equipment may execute the method for spectrum sensing. Specifically, the base station may determine the configuration information of the spectrum sensing guard interval, the user equipment receives the configuration information from the base station, and the user equipment sets the quiet period according to the configuration information, so as to perform the spectrum sensing.

It can be obtained from the method for spectrum sensing according to the embodiments of the present invention with reference to FIG. 1 to FIG. 4 that, the guard period used to prevent interference in a transmission frame is used again, the quiet period is set in the guard period, thereby ensuring the compatibility with the existing protocol without significantly increasing the system complexity; and the spectrum sensing guard interval is set in the guard period, thereby effectively avoiding the interference caused by the signal transmission to the spectrum sensing, and the signal transmission quality is not affected when the spectrum sensing is performed.

Figure 5:
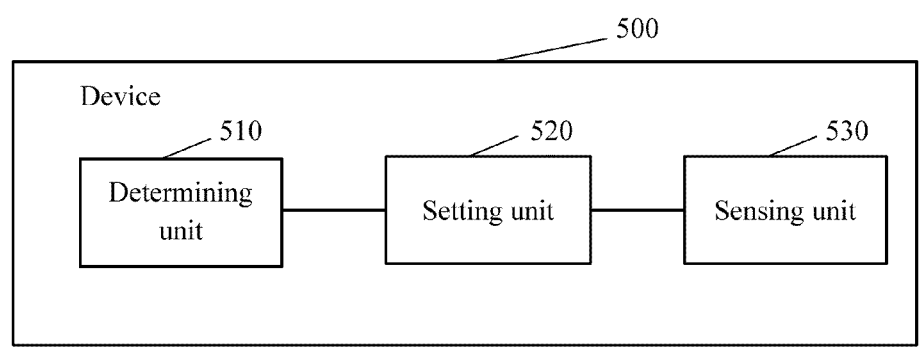
FIG. 5 shows a device for spectrum sensing according to an embodiment of the present invention.

FIG. 5 shows a device 500 for spectrum sensing according to an embodiment of the present invention, which is applied in the above-described system, and the device 500 may be a base station. The device 500 includes: a determining unit 510 configured to determine configuration information of a spectrum sensing guard interval in a guard period, where the spectrum sensing guard interval prevents interference caused by signal transmission to spectrum sensing, the configuration information indicates a position of the spectrum sensing guard interval in the guard period, and the guard period is a period of time in which signal sending is stopped to prevent signal interference; a setting unit 520 configured to set a quiet period in the guard period according to the configuration information of the spectrum sensing guard interval; and a sensing unit 530 configured to perform the spectrum sensing in the quiet period.

The determining unit 510 may determine at least one of the configuration information of a front guard interval at a front end of the guard period and the configuration information of a back guard interval at a back end of the guard period. The determining unit 510 may set the start time of the front guard interval as the start time of the guard period or later then the start time of the guard period for a period of time according to requirements, and determine the length of the front guard interval according to formula 1, thereby determining the configuration information of the front guard interval. However, as an example, when there is no base station causing interference to the spectrum sensing of the base station, or the caused interference is negligible, the configuration information of the front guard interval may not exist. The determining unit 510 may also set the end time of the back guard interval as the end time of the guard period or earlier than the end time of the guard period for a period of time, and determine the length of the back guard interval according to formula 2, so as to determine the configuration information of the back guard interval. Additionally, as an example, when the maximum value of a variance of a timing advance of an uplink signal is set in an uplink pilot time slot of a special subframe, or the interference of the uplink signal is negligible, the configuration information of the front guard interval may be not in existence, and the configuration information of the spectrum sensing guard interval only includes the configuration information of the front guard interval.

The setting unit 520 may set the start time and the length of the quiet period in the guard period according to information such as the start information and the length of the spectrum sensing guard interval, so as to determine the position and the length of the quiet period in the guard period, and the sensing unit 530 performs the spectrum sensing in the quiet period.

The device for spectrum sensing may be a base station, for example, a base station eNB in a TD-LTE system. Alternatively, the device for spectrum sensing may be a user equipment. Specifically, the base station determines the configuration information of the spectrum sensing guard interval. The determining unit 510 in the user equipment is configured to receive the configuration information from the base station, so that the setting unit 520 sets a spectrum according to the configuration information.

In the technical solutions in the embodiment of the present invention, the guard period used to prevent interference in a transmission frame is used again, the quiet period is set in the guard period, thereby ensuring the compatibility with an existing protocol without significantly increasing the system complexity; and the spectrum sensing guard interval is set in the guard period, thereby effectively avoiding the interference caused by the signal transmission to the spectrum sensing, and the signal transmission quality is not affected when the spectrum sensing is performed.

As described above, FIG. 2B shows a frame structure or a data frame about setting a quiet period in a guard period according to an embodiment of the present invention, and the data frame may be used to perform the spectrum sensing. Accordingly, a data frame for spectrum sensing according an embodiment of the present invention is provided, where the data frame is recorded in a guard period in which signal sending is stopped to prevent signal interference, the data frame includes: a spectrum sensing guard interval that prevents interference caused by signal transmission to spectrum sensing, where a position of the spectrum sensing guard interval in the guard period is indicated by configuration information of the spectrum sensing guard interval; and a quiet period, where the spectrum sensing is performed in the quiet period, and the quiet period is determined according to the configuration information of the spectrum sensing guard interval. As an optional embodiment, the spectrum sensing guard interval includes a front guard interval at a front end of the guard period and a back guard interval at a back end of the guard period.

According to the description in FIG. 1 to FIG. 4, the start time of the front guard interval may be set as the start time of the guard period or is later than the start time of the guard period for a period of time, and the length of the front guard interval is determined according to formula 1, so that the configuration information including the start time and the length of the front guard interval is determined. And the end time of the back guard interval may be set as the end time of the guard period or is later than the end time of the guard period for a period of time, and the length of the back guard interval is determined according to formula 2, so that the configuration information including the end time and the length of the back guard interval is determined. The start time and the length of the quiet period are determined according to the configuration information of the front guard interval and/or the configuration information of the back guard interval. After the configuration information of the spectrum sensing guard interval and the configuration information of the quiet period are determined, the data frame for spectrum sensing is determined.

In the embodiment of the data frame of the present invention, the effects of the above technical solutions according the embodiment of the present invention can also be implemented, that is, the quiet period is set in the guard period of the data frame is used, thereby ensuring the compatibility with an existing protocol without significantly increasing the system complexity; and the spectrum sensing guard interval in the guard period of the data frame is used, thereby effectively avoiding the interference caused by the signal transmission to the spectrum sensing, and the spectrum sensing is performed in the condition that the signal transmission is not affected.

Persons of ordinary skill in the art may be aware that the various exemplary units and steps described in combination with the embodiments disclosed herein can be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

In the embodiments provided in the present application, it should be understood that the disclosed method, device, and data frame may be implemented in other manners. For example, the described device embodiments are merely exemplary. For example, the unit division is merely logical function division and can be other division in actual implementation. For example, a plurality of units or components can be combined or integrated into another system, or some features are negligible or not performed.

The units described as separate parts may or may not be physically separate, and parts displayed as units may or may not be physical units, that is, may be located in one position, or may be distributed on a plurality of network units. A part or all of the units may be selected according to the actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or a part of the steps of the method described in the embodiment of the present invention. The storage medium includes: any medium that can store program codes, such as a universal serial bus (USB) flash disk, a removable hard disk, a read-only memory (ROM), a random access memory (RAM), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for spectrum sensing, comprising:
   determining configuration information of a spectrum sensing guard interval in a guard period, wherein the spectrum sensing guard interval prevents interference caused by signal transmission to spectrum sensing, wherein the configuration information indicates a position of the spectrum sensing guard interval in the guard period, and wherein the guard period is a period of time in which signal sending is stopped to prevent signal interference;
   setting a quiet period in the guard period according to the configuration information of the spectrum sensing guard interval; and
   performing the spectrum sensing in the quiet period.

2. The method according to claim 1, wherein the spectrum sensing guard interval comprises at least one of a front guard interval at a front end of the guard period and a back guard interval at a back end of the guard period.

3. The method according to claim 2, wherein the configuration information of the spectrum sensing guard interval comprises at least one of the length of the front guard interval and the length of the back guard interval, and wherein the setting a quiet period comprises setting a start time and the length of the quiet period.

4. The method according to claim 3, wherein the spectrum sensing guard interval at least comprises the front guard interval, wherein the length of the front guard interval is determined according to the following formula $T_{GI1} \geq d/c$, and wherein $T_{GI1}$ is the length of the front guard interval, d is the distance between a base station performing the spectrum sensing and a farthest base station causing interference to the spectrum sensing of the base station, and c is a transmission speed of the electromagnetic wave.

5. The method according to claim 3, wherein the spectrum sensing guard interval at least comprises the back guard interval, wherein the length of the back guard interval is determined according to the following formula $T_{GI2} \geq MAX(Variance)$, wherein $T_{GI2}$ is the length of the back guard interval, and wherein MAX (Variance) is the maximum value of a variance of an uplink timing advance.

6. The method according to claim 2, wherein when there is no base station causing interference to the spectrum sensing of the base station or when the caused interference is negligible, the configuration information of the spectrum sensing guard interval only comprises the configuration information of the back guard interval, or wherein when the maximum value of a variance of a timing advance of an uplink signal is set in an uplink time slot after the guard period or when the interference of the uplink signal is negligible, the configuration information of the spectrum sensing guard interval only comprises the configuration information of the front guard interval.

7. The method according to claim 1, wherein the configuration information is determined by receiving the configuration information of the spectrum sensing guard interval in the guard period from the base station.

8. A device for spectrum sensing, comprising:
a determining unit configured to determine configuration information of a spectrum sensing guard interval in a guard period, wherein the spectrum sensing guard interval prevents interference caused by signal transmission to spectrum sensing, wherein the configuration information indicates a position of the spectrum sensing guard interval in the guard period, and wherein the guard period is a period of time in which signal sending is stopped to prevent signal interference;
a setting unit configured to set a quiet period in the guard period according to the configuration information of the spectrum sensing guard interval; and
a sensing unit configured to perform the spectrum sensing in the quiet period.

9. The device according to claim 8, wherein the spectrum sensing guard interval comprises at least one of a front guard interval at a front end of the guard period and a back guard interval at a back end of the guard period.

10. The device according to claim 9, wherein the configuration information of the spectrum sensing guard interval comprises at least one of the length of the front guard interval and the length of the back guard interval, and wherein the setting unit is configured to set a start time and the length of the quiet period.

11. The device according to claim 10, wherein the spectrum sensing guard interval at least comprises the front guard interval, wherein the length of the front guard interval is determined according to the following formula $T_{GI1} \geq d/c$, and wherein $T_{GI1}$ is the length of the front guard interval, d is the distance between a base station performing the spectrum sensing and a farthest base station causing interference to the spectrum sensing of the base station, and c is a transmission speed of the electromagnetic wave.

12. The device according to claim 10, wherein the spectrum sensing guard interval at least comprises the back guard interval, wherein the length of the back guard interval is determined according to the following formula $T_{GI2} \geq MAX (Variance)$, wherein $T_{GI2}$ is the length of the back guard interval, and wherein MAX (Variance) is the maximum value of a variance of an uplink timing advance.

13. The device according to claim 9, wherein when there is no base station causing interference to the spectrum sensing of the base station or when the caused interference is negligible, the configuration information determined by the determining unit only comprises the configuration information of the back guard interval, or wherein when the maximum value of a variance of a timing advance of an uplink signal is set in an uplink time slot after the guard period or when the interference of the uplink signal is negligible, the configuration information determined by the determining unit only comprises the configuration information of the front guard interval.

14. The device according to claim 8, wherein the determining unit is configured to determine the configuration information by receiving the configuration information of the spectrum sensing guard interval in the guard period from the base station.

15. A data frame for spectrum sensing, recorded in a guard period in which signal sending is stopped to prevent signal interference, and comprising:
a spectrum sensing guard interval that prevents interference caused by signal transmission to spectrum sensing, wherein a position of the spectrum sensing guard interval in the guard period is indicated by configuration information of the spectrum sensing guard interval; and
a quiet period, wherein the spectrum sensing is performed in the quiet period, and wherein the quiet period is determined according to the configuration information of the spectrum sensing guard interval.

16. The data frame according to claim 15, wherein the spectrum sensing guard interval comprises at least one of a front guard interval at a front end of the guard period and a back guard interval at a back end of the guard period.

17. The data frame according to claim 16, wherein the configuration information of the spectrum sensing guard interval comprises at least one of the length of the front guard interval and the length of the back guard interval, and wherein a start time and the length of the quiet period are determined according to the configuration information of the spectrum sensing guard interval.

18. The data frame according to claim 17, wherein in the condition that the spectrum sensing guard interval at least comprises the front guard interval, the length of the front guard interval is determined according to the following formula $T_{GI1} \geq d/c$, and wherein $T_{GI1}$ is the length of the front guard interval, d is the distance between a base station performing the spectrum sensing and a farthest base station causing interference to the spectrum sensing of the base station, and c is a transmission speed of the electromagnetic wave.

19. The data frame according to claim 17, wherein in the condition that the spectrum sensing guard interval at least comprises the back guard interval, the length of the back guard interval is determined according to the following formula $T_{GI2} \geq MAX(Variance)$, wherein $T_{GI2}$ is the length of the back guard interval, and wherein MAX (Variance) is the maximum value of a variance of an uplink timing advance.

20. The data frame according to claim 16, wherein when there is no base station causing interference to the spectrum sensing of the base station or when the caused interference is negligible, the configuration information of the spectrum sensing guard interval only comprises the configuration information of the back guard interval, or wherein when the maximum value of a variance of a timing advance of an uplink signal is set in an uplink time slot after the guard period or when the interference of the uplink signal is negligible, the configuration information of the spectrum sensing guard interval only comprises the configuration information of the front guard interval.

* * * * *

UNITED STATES PATENT AND TRADEMARK OFFICE
CERTIFICATE OF CORRECTION

PATENT NO. : 8,855,080 B2  
APPLICATION NO. : 14/283397  
DATED : October 7, 2014  
INVENTOR(S) : Lei Chen Page 1 of 1

It is certified that error appears in the above-identified patent and that said Letters Patent is hereby corrected as shown below:

IN THE CLAIMS

Column 12, Lines 6, Claim 12 should read:

The device according to claim 10, wherein the spectrum sensing guard interval at least comprises the back guard interval, wherein the length of the back guard interval is determined according to the following formula $T_{GI2} \geq MAX\ (Variance)$, wherein $T_{GI2}$ is the length of the back guard interval, and wherein $MAX(Variance)$ is the maximum value of a variance of an uplink timing advance.

Signed and Sealed this  
Sixth Day of January, 2015

Michelle K. Lee  
*Deputy Director of the United States Patent and Trademark Office*